Patented May 25, 1948

2,442,200

UNITED STATES PATENT OFFICE 2,442,200

PRESERVATION OF RUBBER

Frederick B. Downing and Charles J. Pedersen, Penns Grove, N. J., assignors to E. I. du Pont de Nemours & Company, Wilmington, Del., a corporation of Delaware No Drawing. Original application September 27, 1941, Serial No. 412,602. Divided and this application November 1, 1944, Serial No. 561,489

13 Claims. (Cl. 260—796)

This invention relates to the stabilization of organic substances and particularly to the stabilization of such substances which are subject to deterioration caused by the action of molecular oxygen and catalyzed by metals and their compounds.

Many organic substances, such as fats, edible oils, vegetable juices, textile fibres, rubber, photographic developers and synthetic unsaturated compounds, are readily attacked by oxygen and the resulting deterioration, whether due to the accumulation of oxidation products or to secondary reactions induced by the primary oxidation products, imparts undesirable qualities to the substances and eventually destroys their usefulness.

The oxidation of these substances is promoted by: (1) autogenous catalysts formed by the oxidation of the substances themselves, and (2) extraneous catalysts which are accidentally present in the substances.

The autogenous catalysts, generally considered to be peroxides or monoxides, are responsible for the phenomenon termed auto-oxidation, wherein the reaction proceeds very slowly at first but gradually accelerates until a maximum is reached. The initial period of negligible reaction rate is called the induction period. Since these catalysts are integral constituents of the oxidative system, the particular process of oxidation cannot occur in their absence, and being derivatives of the substances, they are variable and possess different chemical properties.

On the other hand, the extraneous catalysts, restricted in this case to copper, cobalt, iron and their compounds, do not occur of necessity in any organic substance which is not a derivative of these metals. Such metals may be present accidentally in any organic substance. The catalytic activity of these metals is inherent and is possessed by them in any medium unless the activity has been modified or suppressed by chemical means.

It has been found that certain compounds, known as antioxidants, retard the purely auto-catalytic process, while some other compounds, herein named metal deactivators, suppress the catalytic activity of copper, cobalt, iron and their compounds. The nature and the action of antioxidants and metal deactivators will be described below, but without further discussion it may be concluded, from the facts presented above, that antioxidants must be specific with respect to the oxidizable organic substances and that deactivators must be specific for copper, cobalt and iron, and independent of the medium. Certain factors, however, such as reactivity or insolubility, will determine whether a given deactivator can or cannot be used in a particular system.

Signal success has been achieved in recent years, in the preservation of many organic substances, by the discovery and use of compounds generically called "oxidation inhibitors" or "antioxidant." These agents, mostly oxidizable organic compounds, retard the auto-catalytic process. Since antioxidants are themselves oxidized in the course of time, as a result of auto-oxidation, the beneficial effect obtained by their use is not permanent, and they protect the organic substances only so long as they are not rendered inactive. They are, moreover, very specific in action, each group of auto-oxidizable substances requiring a different type of antioxidant for the best results.

Copper, cobalt, iron and their compounds accelerate the rate of oxidation of many organic substances, including most of the antioxidants. Copper is generally the most potent. It is well known that these metals promote the formation of gum in gasoline, and speed up the aging of rubber and the development of rancidity in fats and oils. Hence these metals and antioxidants are antagonistic in action, and the normal inhibiting effect of the latter is greatly reduced in the presence of the former.

Copper occurs naturally in many organic substances, but usually in such slight traces as to cause very little harm. The concentration of copper, however, is frequently raised during the course of handling and utilizing the substances. Vessels and conduits, made of metals containing copper, are used for storage and transportation. Ingredients, contaminated with copper, may be added. Copper may actually be required in one of the steps in the process for manufacture, as in the copper sweetening of gasoline.

It is an object of the present invention to retard the deterioration of organic substances caused by the action of molecular oxygen and catalyzed by the presence of catalysts, such as copper, cobalt, iron and their compounds. Another object is to render antioxidants, which are relatively ineffective in the presence of copper, cobalt, iron and their compounds, effective to inhibit the oxidation of oxidizable organic substances even in the presence of copper, cobalt, iron and their compounds. A further object is to provide a new class of metal deactivators which are effective to render catalysts, such as copper, cobalt, iron and their compounds, inactive to catalyze the oxidation of oxidizable organic substances containing or in contact therewith. A still further object is to inhibit the deterioration of elastomers, such as rubber, in the presence of copper, cobalt, iron and their compounds. Other objects are to provide new compositions of matter and to advance the art. Still other objects will appear hereinafter.

The above and other objects may be accomplished in accordance with our invention which comprises adding to elastomers, such as rubber, normally subject to deterioration caused by the action of molecular oxygen, and containing a catalyst of the group of copper, cobalt, iron and their compounds, normally effective to catalyze oxidation of said elastomers, a small proportion of a metal deactivator sufficient to deactivate the catalyst, such metal deactivator having the formula HO—R—CH=N—R'—OH wherein each of R and R' represents an ortho divalent aromatic radical. The elastomers may also and generally will contain an antioxidant which is normally effective to retard oxidation of the elastomer in the absence of the catalyst. We have found that such metal deactivators will render the catalysts ineffective to catalyze the oxidation of the elastomer, including the antioxidant, when present.

Generally, in practice, the elastomer will also contain an antioxidant which is normally effective to materially retard the deterioration or oxidation of the elastomer in the absence of the catalytically active metals, but which is less effective in the presence of such metals.

Referring to the formula

HO—R—CH=N—R'—OH, the term "ortho" means that the free valences belong to adjacent carbons of a benzene ring so that each of the hydroxy groups is ortho to the —CH=N— group. By the term "arylene," we mean a divalent aromatic radical which consists of the elements carbon and hydrogen. By the term "mononuclear . . . radical of the benzene series," we mean that the radical contains only one benzene ring. While the radicals, represented by R and R', may contain a plurality of benzene rings as in diphenyl, naphthyl, anthracyl, phenanthryl and like compounds, we preferably employ those compounds wherein each of R and R' represents an ortho divalent mononuclear aromatic radical of the benzene series. Also, while R and R' may contain non-hydrocarbon substitutents, such as alkoxy, nitro, amino, hydroxy, aryloxy, halogen, cyano, carboxyl, sulfonic acid and ester groups, we preferably employ those in which each of R and R' represents an ortho arylene radical. Amongst the compounds of our invention, we have found the following to be particularly effective for our purpose:

Salicylal o-aminophenol
2-hydroxy-3-methoxybenzal o-aminophenol
2-hydroxy-5-methoxybenzal o-aminophenol
2-hydroxy-3-nitrobenzal o-aminophenol
2-salicylalamino-4-aminophenol disalicylal 2,4-diaminophenol
2-hydroxy-5-ter.-butylbenzal o-aminophenol
2-hydroxy-1-naphthal o-aminophenol Definite operative concentrations of the metal deactivator cannot be specified for each case as the quantity required is dependent upon the amount of metal present in the elastomer. The metal deactivator should be present in the proportion of approximately 3 to 10 times the amount of the metal present, in order to obtain complete deactivation. Higher proportions of metal deactivator may be employed, particularly when a reservoir of metal is present in the form of metal in bulk. Generally from about 0.5% to about 1%, based on the weight of the elastomer, will be sufficient for most purposes.

The catalytically active metal and its compounds may be dissolved in the elastomer or dispersed therein or may be in the form of metal in bulk in intimate contact with the elastomer. It will be understood that, when we refer to an elastomer containing a catalyst, we mean to include those cases wherein the metal in bulk form is in contact with the elastomer, as well as those cases wherein the catalytically active metal is dissolved and dispersed in the elastomer.

The magnitude of the catalytic effect is dependent upon the chemical form of the copper as well as upon its concentration or the area of contact. The following substances were found to have readily measurable pro-oxidant effect: cupric chloride and oleate, metallic copper, cuprous and cupric oxides and cupric sulfide. Even Babbitt metal and aluminum alloys, containing copper, decrease the induction period of gasoline.

Copper is one of the most potent catalysts for the oxidation of many organic products. It is the most powerful and one of the commonest metal contaminants. Other metals, however, possess different degrees of catalytic activity. Cobalt is quite active, but it seldom occurs in elastomers. Iron is abundant but it is a feeble catalyst. Manganese is definitely harmful, but nickel is practically inert.

It might be casually assumed that, if a metal deactivator suppresses the activity of one metal, it should do the same for all similar metals, or metals possessing similar catalytic effects. Experiments have proven this assumption to be erroneous. For example, salicylal o-aminophenol deactivates copper, cobalt and iron, but actually increases the catalytic potency of manganese and nickel. The effect on nickel is interesting since it makes an inert substance catalytically active. It is readily seen that generalizations with respect to different metals are likely to lead to error. The only safe course is to experimentally determine the effects of deactivators on the metals and not to depend upon deductions.

It might be assumed further that, since the condensation products of ortho-hydroxy aromatic aldehydes with ortho-hydroxy aromatic primary amines are metal deactivators, the condensation products of all aromatic aldehydes with all aromatic primary amines are also metal deactivators. It has been experimentally established that this is not the case. All the compounds of this type, which are effective deactivators, contain an ortho-hydroxyl group in each ring, that is, they have at least two hydroxyl groups and in the proper positions. For example, salicylal p-aminophenetole, salicylal aniline, p-tolual o-aminophenol, salicylal m-aminophenol, salicylal p-aminophenol, salicylal o-aminoanisole and di-(p-tolual) 2-4-di-aminophenol are not effective metal deactivators.

It will be observed that the lack of a hydroxyl group in the correct position, the placing of a hydroxyl in a wrong position or blocking a hydroxyl group in the correct position by conversion to an ether renders the compounds so slightly effective that they cannot be classed together with the compounds covered by this invention.

Salicylal p-aminophenol appears to have considerable effect, but the condensation products of p-aminophenol with aldehydes are well recognized gasoline antioxidants. Where salicylal p-aminophenol is tested at much lower concentrations, the effect is shown to be practically negligible.

It has long been recognized that small traces of copper have a very pronounced catalytic effect on the oxidation of elastomers, such as rubber.

In order to overcome this difficulty, it has been necessary to establish rigorous specifications for the copper content of compounding agents used in rubber. In many cases, particularly with dyes, the removal of traces of copper is both troublesome and expensive.

In general, the common antioxidants used in rubber are unable to suppress the catalytic action of copper. The metal deactivators, however, have been found to be very effective for this purpose. The bomb physical test was employed as a method of evaluating these compounds. The following stock was used in these tests:

| | |
|---|---|
| Pale crepe | 100 |
| Zinc oxide | 100 |
| Sulfur | 3 |
| Stearic acid | 1 |
| Lithopone | 20 |
| Di-(o-tolyl) guanidine | 0.75 |
| Phenyl-beta-naphthylamine (antioxidant) | 1.0 |
| Copper as stearate | x |
| Metal deactivator | 0.5 |

Cured for 45 min. at 40 pound steam pressure.

bility, as do sulfonic and carboxyl radicals.

Unlike the antioxidants the metal deactivators are resistant to the action of molecular oxygen, and solutions of the deactivators may be kept in the presence of air for years without any apparent change. They are thermally stable but are destroyed by strong mineral acids.

The deactivators may be added to the elastomer to be protected in any form and manner. They may be in solid or liquid form, mixed with other addition agents or dissolved in a solvent. They may be added to the finished products or at any stage in the process for their manufacture.

If the metal deactivators are sufficiently soluble in the elastomer and the conditions are not destructive, they will suppress the catalytic activity of the metals present. They are operative, therefore, in any elastomer, natural or synthetic, whose rate of deterioration is accelerated by copper, cobalt or iron. The deactivators also function in solutions of these substances in solvents as well as in mixtures.

Mixtures of metal deactivators may be used, as well as the condensation products of a given amine with a mixture of aldehydes or a given

TABLE

*The effect of metal deactivators in rubber containing copper and an antioxidant*

| Days at 70° C. & 300# O₂ | Control No Cu | | Control 0.005% Cu | | 0.005% Cu 0.5% MD¹ | | 0.005% Cu 0.5% MD² | | Control 0.01% Cu | | 0.01% Cu 0.5% MD¹ | |
|---|---|---|---|---|---|---|---|---|---|---|---|---|
| | Tens. | Per Cent El. | Tens. | Per Cent El. | Tens. | Per Cent El. | Tens. | Per Cent El. | Tens. | Per Cent El. | Tens. | Per Cent El. |
| 0 | 3,875 | 660 | 3,950 | 680 | 3,650 | 660 | 3,650 | 700 | 3,850 | 660 | 3,775 | 680 |
| 2 | 2,800 | 670 | 1,400 | 620 | 2,900 | 620 | 2,925 | 620 | Melted off | | 2,500 | 600 |
| 5 | 2,275 | 600 | 675 | 440 | 2,175 | 600 | 2,800 | 620 | | | 1,725 | 600 |
| 7 | 2,150 | 580 | Melted off | | 2,075 | 580 | 2,700 | 620 | | | 1,525 | 560 |
| 9 | 1,800 | 560 | | | 1,625 | 540 | 2,350 | 600 | | | 1,250 | 520 |
| 12 | 1,550 | 500 | | | 1,500 | 500 | 2,175 | 580 | | | 1,125 | 500 |
| 14 | 1,475 | 500 | | | 1,350 | 500 | 2,075 | 600 | | | 1,025 | 580 |
| 17 | | | | | | | 1,775 | 560 | | | | |
| 19 | 1,725 | 460 | | | 1,275 | 460 | | | | | 750 | 360 |
| 21 | 1,375 | 500 | | | 1,175 | 500 | | | | | 750 | 380 |

MD¹=salicylal o-aminophenol.
MD²=2-hydroxy-5-methoxybenzal o-aminophenol.

It will be seen from this table that the antioxidant, phenyl-beta-naphthylamine, is unable to deactivate copper. On the other hand, the two deactivators are about equally effective and overcome practically all the catalytic action of the added copper.

The metal deactivators, belonging to the particular class of this invention, are easily prepared by reacting one mol of aldehyde with one mol of amine with or without the use of a suitable solvent, such as water, methanol, ethanol, pyridine or benzene. The reactions are exothermic and water is formed. Nearly theoretical yields of the compounds are obtained. The chemical equation for the formation of salicylal o-aminophenol, SOA, is:

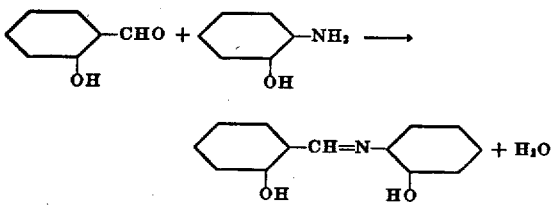

Their solubility in elastomers is dependent upon their constitution. For example, the ring alkylated compounds tend to be more soluble than those without hydrocarbon ring substituents. Additional hydroxyl groups decrease solualdehyde with a mixture of amines. Besides many others, the compounds, obtained by condensing each of the following aldehydes with each of the following amines, are metal deactivators:

| Aldehydes | Amines |
|---|---|
| 2-hydroxybenzaldehyde | 2-aminophenol |
| 2-hydroxy-5-chlorobenzaldehyde | 2-amino-5-methylphenol |
| 2-hydroxy-3,5-dibromobenzaldehyde | 2,amino-4-nitrophenol |
| 2-hydroxy-3-nitrobenzaldehyde | 2,4-diaminophenol |
| 2-hydroxy-6-methylbenzaldehyde | 2-amino-6-isoprophylphenol |
| 2-hydroxy-3-methoxybenzaldehyde | 2-amino-4-acetylaminophenol |
| 2,4-dihydroxybenzaldehyde | 2-aminonaphthol-1 |
| 2,6-dihydroxybenzaldehyde | 1-aminonaphthol-2 |
| 2-hydroxy-3-cyanobenzaldehyde | 3-aminonaphthol-2 |
| 2-hydroxy-3-carboxybenzaldehyde | 3-amino-4-hydroxydiphenyl |
| 2-hydroxybenzaldehyde-3-sulfonic acid | 2-amino-3-hydroxypyridine |
| 1 hydroxynaphthaldehyde-2 | 3-amino-4-hydroxyquinoline |
| anthrol-2-aldehyde-1 | |
| 2-hydroxyfluorene-aldehyde-1 | |
| 4-hydroxydiphenyl-aldehyde-3 | |
| 3-hydroxyphenanthrene-aldehyde-4 | |
| 1,3-dihydroxy-2,4-dialdehydebenzene | |
| 4-hydroxypyridine-aldehyde-3 | |
| 4-hydroxyquinoline-aldehyde-3 | |
| 7-hydroxyquinoline-aldehyde-3 | |

It will be readily apparent to those skilled in the art that many variations and modifications can be made without departing from the spirit or scope of our invention. Accordingly, our invention is not to be limited to the specific embodiments disclosed in the examples, but we intend to cover our invention broadly as in the appended claims.

This application is a division of our application Serial No. 412,602, filed September 27, 1941, and now Patent No. 2,426,766, issued September 2, 1947.

We claim:

1. A composition comprising rubber, normally subject to deterioration caused by the action of molecular oxygen, containing a catalyst of the group consisting of copper, cobalt, iron and their compounds, normally effective to catalyze oxidation of said rubber, and having incorporated therein a metal deactivator in a small proportion sufficient to deactivate said catalyst, said metal deactivator having the formula

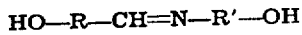

wherein each of R and R' represents an ortho arylene radical.

2. A composition comprising rubber, normally subject to deterioration caused by the action of molecular oxygen, containing a catalyst of the group consisting of copper, cobalt, iron and their compounds, normally effective to catalyze oxidation of said rubber, a small amount of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator having the formula

wherein each of R and R' represents an ortho divalent aromatic radical.

3. A composition comprising rubber, normally subject to deterioration caused by the action of molecular oxygen, containing a catalyst of the group consisting of copper, cobalt, iron and their compounds, normally effective to catalyze oxidation of said rubber, a small amount of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator having the formula

wherein each of R and R' represents an ortho arylene radical.

4. A composition comprising rubber, normally subject to deterioration caused by the action of molecular oxygen, containing a catalyst of the group consisting of copper, cobalt, iron and their compounds, normally effective to catalyze oxidation of said rubber, a small amount of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator having the formula

wherein each of R and R' represents an ortho divalent mononuclear aromatic radical of the benzene series.

5. A composition comprising rubber, normally subject to deterioration caused by the action of molecular oxygen, containing a catalyst of the group consisting of copper, cobalt, iron and their compounds, normally effective to catalyze oxidation of said rubber, a small amount of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator having the formula

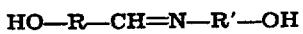

wherein each of R and R' represents an ortho mononuclear arylene radical of the benzene series.

6. A composition comprising rubber, normally subject to deterioration caused by the action of molecular oxygen, containing a catalyst of the group consisting of copper, cobalt, iron and their compounds, normally effective to catalyze oxidation of said rubber, a small amount of an antioxidant, normally effective to materially retard such deterioration in the absence of said catalyst but which is less effective in the presence of said catalyst, and having incorporated therein a metal deactivator in a small proportion sufficient to deactivate said catalyst, said metal deactivator being salicylal o-aminophenol.

7. A composition comprising rubber, normally subject to deterioration caused by the action of molecular oxygen, containing a catalyst of the group consisting of copper, cobalt, iron and their compounds, normally effective to catalyze oxidation of said rubber, and having incorporated therein a metal deactivator in a small proportion sufficient to deactivate said catalyst, said metal deactivator having the formula

wherein each of R and R' represents an ortho divalent aromatic radical.

8. A composition comprising rubber, normally subject to deterioration caused by the action of molecular oxygen, containing a catalyst of the group consisting of copper, cobalt, iron and their compounds, normally effective to catalyze oxidation of said rubber, and having incorporated therein a metal deactivator in a small proportion sufficient to deactivate said catalyst, said metal deactivator having the formula

wherein each of R and R' represents an ortho divalent mononuclear aromatic radical of the benzene series.

9. A composition comprising rubber, normally subject to deterioration caused by the action of molecular oxygen, containing a catalyst of the group consisting of copper, cobalt, iron and their compounds, normally effective to catalyze oxidation of said rubber, and having incorporated therein a metal deactivator in a small proportion sufficient to deactivate said catalyst, said metal deactivator having the formula

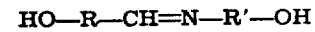

wherein each of R and R' represents an ortho mononuclear arylene radical of the benzene series.

10. A composition comprising rubber, normally subject to deterioration caused by the action of molecular oxygen, containing a catalyst of the group consisting of copper, cobalt, iron and their compounds, normally effective to catalyze oxidation of said rubber, and having incorporated therein a metal deactivator in a small proportion sufficient to deactivate said catalyst, said metal deactivator being salicylal o-aminophenol.

11. The method of inhibiting the catalytic oxidation of rubber caused by a catalyst of the group consisting of copper, cobalt, iron and their compounds which comprises incorporating in said rubber a small amount, sufficient to deactivate said catalyst, of a metal deactivator having the formula

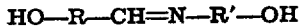

wherein each of R and R' represents an ortho divalent aromatic radical.

12. The method of inhibiting the catalytic oxidation of rubber caused by a catalyst of the group consisting of copper, cobalt, iron and their compounds which comprises incorporating in said rubber a small amount, sufficient to deactivate said catalyst, of a metal deactivator having the formula

wherein each of R and R' represents an ortho divalent mononuclear aromatic radical of the benzene series.

13. The method of inhibiting the catalytic oxidation of rubber caused by a catalyst of the group consisting of copper, cobalt, iron and their compounds which comprises incorporating in said rubber a small amount, sufficient to deactivate said catalyst, of a metal deactivator, said metal deactivator being salicylal o-aminophenol.

FREDERICK B. DOWNING.
CHARLES J. PEDERSEN.

REFERENCES CITED

The following references are of record in the file of this patent:

UNITED STATES PATENTS

| Number | Name | Date |
|---|---|---|
| 2,249,602 | Chenicek | July 15, 1941 |
| 2,300,998 | White | Nov. 3, 1942 |

---

Certificate of Correction

Patent No. 2,442,200.   May 25, 1948.

FREDERICK B. DOWNING ET AL.

It is hereby certified that error appears in the printed specification of the above numbered patent requiring correction as follows: Column 1, line 23, for the word "monoxides" read moloxides; and that the said Letters Patent should be read with this correction therein that the same may conform to the record of the case in the Patent Office.

Signed and sealed this 3rd day of August, A. D. 1948.

[SEAL]

THOMAS F. MURPHY,
*Assistant Commissioner of Patents.* tion sufficient to deactivate said catalyst, said metal deactivator being salicylal o-aminophenol.

11. The method of inhibiting the catalytic oxidation of rubber caused by a catalyst of the group consisting of copper, cobalt, iron and their compounds which comprises incorporating in said rubber a small amount, sufficient to deactivate said catalyst, of a metal deactivator having the formula

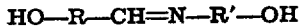

wherein each of R and R' represents an ortho divalent aromatic radical.

12. The method of inhibiting the catalytic oxidation of rubber caused by a catalyst of the group consisting of copper, cobalt, iron and their compounds which comprises incorporating in said rubber a small amount, sufficient to deactivate said catalyst, of a metal deactivator having the formula

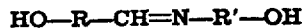

wherein each of R and R' represents an ortho divalent mononuclear aromatic radical of the benzene series.

13. The method of inhibiting the catalytic oxidation of rubber caused by a catalyst of the group consisting of copper, cobalt, iron and their compounds which comprises incorporating in said rubber a small amount, sufficient to deactivate said catalyst, of a metal deactivator, said metal deactivator being salicylal o-aminophenol.

FREDERICK B. DOWNING.
CHARLES J. PEDERSEN.

REFERENCES CITED

The following references are of record in the file of this patent:

UNITED STATES PATENTS

| Number | Name | Date |
|---|---|---|
| 2,249,602 | Chenicek | July 15, 1941 |
| 2,300,998 | White | Nov. 3, 1942 |

Certificate of Correction

Patent No. 2,442,200.                                                                May 25, 1948.

FREDERICK B. DOWNING ET AL.

It is hereby certified that error appears in the printed specification of the above numbered patent requiring correction as follows: Column 1, line 23, for the word "monoxides" read *moloxides*; and that the said Letters Patent should be read with this correction therein that the same may conform to the record of the case in the Patent Office.

Signed and sealed this 3rd day of August, A. D. 1948.

[SEAL]

THOMAS F. MURPHY,
*Assistant Commissioner of Patents.*